US006338040B1

United States Patent
Buman et al.

(10) Patent No.: US 6,338,040 B1
(45) Date of Patent: Jan. 8, 2002

(54) METHOD FOR DELAYING THE DEVELOPMENT IN PEST SPECIES OF RESISTANCE TO CONTROL TECHNIQUES, USING INSURANCE TO ENCOURAGE CORRECT USES OF REFUGES

(75) Inventors: Thomas J. Buman; Stanley Buman, both of Carroll, IA (US)

(73) Assignee: Agren, Inc., Carroll, IA (US)

( * ) Notice: Subject to any disclaimer, the term of this patent is extended or adjusted under 35 U.S.C. 154(b) by 0 days.

(21) Appl. No.: 09/249,973

(22) Filed: Feb. 12, 1999

(51) Int. Cl.$^7$ ............................................... G06F 17/60
(52) U.S. Cl. ............................. 705/4; 705/1; 705/500
(58) Field of Search ................................ 705/1, 4, 500; G06F 17/60

(56) References Cited

U.S. PATENT DOCUMENTS 5,802,493 A * 9/1998 Sheflott et al. ................. 705/1
5,974,390 A * 10/1999 Ross ............................. 705/4
6,092,047 A * 7/2000 Hyman et al. ................. 705/4

FOREIGN PATENT DOCUMENTS

WO  WO 0019820 A  *  4/2000  .......... A01N/25/00

OTHER PUBLICATIONS

"Bt corn & European corn borer—Long–term success through resistance management", from Regents of the University of Minnesota, Mn, Sep. 1997.*

(List continued on next page.)

Primary Examiner—V. Miller
Assistant Examiner—Cuong H. Nguyen

(74) Attorney, Agent, or Firm—Chapman and Cutler

(57) ABSTRACT

An insurance or warranty method protects financial interests of producers, such as farmers planting transgenic varieties of seed as a primary asset, who use proper refuges of similar but non-transgenic, secondary assets for maintaining a non-resistant pest population. Refuge acre methods, now sometimes called "refugia", as such are recently known in crop pest management, but producers have had no effective incentive and much risk in using them. That is, losses in the refuge from pests, as to corn from European Corn Borers and others, are immediate and could be severe, whereas build-up of resistance to the related control technique is a long-term problem. Providing insurance as part of the cost of the primary production input, or as an add-on "technology fee" or the like, for protecting a set amount of the similar, secondary asset, removes the risks from the pest in producing secondary assets in the refuge. This method helps enforce refuge plan conditions such as size and location of the refuge in relation to that of the primary asset. This insurance or warranty method has broad application in pest control technique management, to genetically modified crops such as corn, soybeans, cotton, and the like and in animal husbandry such as in fish and shellfish farms and disease control in livestock management. It applies to other control techniques such as spraying with insecticides, and to many pests such as European Corn Borer, corn rootworm, corn ear worm, cotton boll weevil, Colorado potato beetle, and the like. When a claim for damage to a secondary asset in a refuge is to be adjusted, the insurance or warranty adjuster may check first for refuge condition compliance (and also can assess development of resistance of the pest species in the primary asset), and will then assess damage from the pest to the secondary asset. The decrease in yield times the crop price is determined and paid to the producer in cash at harvest time, in seed the following season, or in another agreeable fashion in accordance with the insurance policy or warranty terms.

46 Claims, 2 Drawing Sheets

OTHER PUBLICATIONS

Mabbett, "What's in store for rice; methods of storing rice may differ around the world, but one thing is universal, everyone is trying to find ways of reducing product losses during storage . . . ", from Agrebusiness Worldwide, v15, n2, p14(4), Apr. 1993.*

Lopez et al., Feeding attractant and stimulant for adult control of noctuid and other lepidopteran species . . . , from DialogClassic Web(tm) file 349, Oct. 1998.*

Alexander et al., Pesticidal compositions, from DialogClassic Web(tm) file 349, Jun. 1998.*

John Reason et al., Controlling ROW Maintenance Costs: Progressive right–of–way managers are using strategically selected vegetation control . . . , Electrical World Journal, p. 16, vol. 211, No. 12, Dec. 1997.*

From DialogClassic Web(tm) file 636, National Agricutural Statics Service: Feed Yearbook—Part III of V, M2 Presswire, Apr. 1998.*

Sep. 1997, North Central Regional Extension, "Bt Corn & European Corn Borer—Long–Term Success Through Resistance Management", Publication 602, all pages.

Jul. 1996, North Central Regional Extension, "European Corn Borer—Ecology and Management", Publication No. 327, all pages.

1998, Union of Concerned Scientists, "Now or Never: Serious New Plans to Save a Natural Pest Control", Chapter 2, pp. 13–18.

Jun. 24, 1998, In American Bar Association, Section of Natural Resources, Energy, and Environmental Law, $2^{nd}$ Annual Roundtable, "Mechanisms for International Protection for Agricultural Biotechnology: Resistant Insects and Superweeds": Sachs, Eric S. (Monsanto Company), "Preserving Bt Technology and Maximizing Benefits: A Balanced Insect Resistance Management Approach".

* cited by examiner

METHOD FOR DELAYING THE DEVELOPMENT IN PEST SPECIES OF RESISTANCE TO CONTROL TECHNIQUES, USING INSURANCE TO ENCOURAGE CORRECT USES OF REFUGES

FIELD OF THE INVENTION

The present invention relates to methods of guiding behavior of producers such as farmers to favor long-term rather than short-term economic results, and particularly to providing economic protections or incentives to producers to comply with best management practices. It has particular and immediate application to the growing of crops and other resources subject to damage from pests which develop resistance to the control techniques used.

BACKGROUND OF THE ART

Most agricultural scientists believe there are benefits to growing genetically-modified, transgenic crops with adjacent areas of non-modified but similar crops in order to delay the development in pest species of resistance to the modification. Such adjacent areas are known as "refuges", and the practice or science is spoken of as "refugia". This refuge system has applicability to many pest and disease management techniques. A typical example is Bt corn, which is hybrid field corn that is modified genetically to express in the leaves and stem of the plant a toxin (a crystal-like protein, which occurs naturally in the *Bacillus thuringiensis*) that is generally fatal upon reaching the gut of the European Corn Borer ("ECB"), *Ostrinia nubilalis* Hübner, as the individual larvae feed. A very small percentage of ECB individuals in the current population, however, may have single or double genes for resistance to Bt toxin. Those individuals which survive feeding on high-dose Bt corn, believed to be normally only those with two resistant genes, then mature and reproduce. If these resistant individuals mate chiefly with other survivors also having two resistant genes, they pass pairs of resistant genes to their offspring. Then the numbers and percentages of resistant individuals in the pest population will grow with each generation. If the resistant survivors mate principally with ECB individuals not screened by the Bt corn toxin for survival, however, as by their feeding solely on non-Bt corn, then Bt resistance in the population will not grow so quickly. See, Ostlie, K. R., W. D Hutchinson, and R. L. Hellmich, 1997, "Bt Corn & European Corn Borer: Long-Term Success through Resistance Management", pp. 11–12, North Central Regional Extension Publication NCR 602, University of Minnesota, St. Paul, Minn.

Providing refuges of non-Bt corn in areas of, or adjacent to, fields of Bt corn, to sustain a population of non-resistant individuals, is the recommended best management practice for delaying the development in ECB of resistance to Bt toxins. Five to 30% of the acreage planted in corn should be set aside for non-Bt corn, or 40% if the refuge area is treated with an insecticide if an infestation of ECB occurs during the growing season, according to such practices. Id., at 12. However, since on average the yield of non-Bt corn is 18% less than that of Bt corn, and can vary from the same to half the yield or less, farmers have significant short-term economic incentive to plant 100% Bt corn or other modified primary crop, not just 60% to 95%. They can and do violate label licenses and Federal Environmental Protection Agency ("EPA") recommendations through various techniques, such as buying their Bt seed requirements from different suppliers to hide their non-use of non-Bt corn, or selling free seed given to them along with the Bt corn seed purchased, and the like.

An important reason for maintaining non-resistant ECB is that Bt toxin is a widely used organic pesticide, applied as a spray to control ECB pests. Spraying of Bt toxin onto organic corn is a traditional and irreplaceable use of Bt technology, which practice is threatened by the development of resistance in the ECB through widespread use of Bt corn.

Insurance products are just beginning to be used in agriculture to reduce or avoid the economic risks of reducing other sorts of inputs to crops. For instance, farm operators use commercial nitrogen to ensure adequate soil fertility for crop growth. Determining optimal nitrogen levels is difficult from one year to the next because of variability in weather. Producers are unsure of the optimum level of nitrogen needed at the time when they must apply the nitrogen. Therefore, producers will often use supplemental nitrogen, such as a double dose of nitrogen in the spring, to guard against any inability, as due to summer rains creating muddy fields, to make a second application of nitrogen if needed in July. This is a form of self-help insurance, an expense incurred to protect against a potentially greater loss of crop yield due to insufficient nitrogen. Such overuse of nitrogen fertilizer is a recognized and growing environmental pollution problem. Within the U.S. Congress and in the EPA, initiatives are underway to restrict nitrogen use. Reductions in nitrogen applications will aid in alleviating environmental problems and potentially save on farm production expenses, but risk of crop loss is increased. Prior to any such limitation on nitrogen use, a plan needs to be in place to reduce the risk of having insufficient nitrogen. Many practices have been developed and are recommended by various researchers and universities, but each such practice carries its own risk. Insurance products are now being proposed that would compensate for reduced crop yield arising because of insufficient nitrogen caused by following nitrogen reduction practices. These insurance policies create new incentives to encourage producers to limit nitrogen application, and the overuse of other chemicals, to avoid environmental degradation and risks to public health.

For instance, one reason that farmers put extra nitrogen into the soil in the spring is that rainfall may be such that a second nitrogen application in mid-summer, to boost the levels when needed, cannot timely be made. Insurance against excess rainfall costs less than the incremental cost of a double dose of nitrogen in the spring, and avoids the leaching of the nitrogen into ground and stream water and/or its passing into the air, which are known to cause serious environmental pollution. If more nitrogen is needed and can be applied when needed, as in July, then the insurance premium paid is "lost". If there is excess rainfall and nitrogen is needed but cannot be applied, however, the decrease in crop yield is covered by an insurance payment. In either event, the producer saves the extra cost of applying excessive nitrogen in the spring. Insurance policies for such purposes are being developed for testing in the spring of 1999.

No use of insurance to encourage use of refuges for delaying the development of resistance in target pest species is known. Alternative encouragement tactics of education, regulatory enforcement, license restrictions, provision of free non-Bt seed, and the like are not likely to prove effective even after several years' use. The EPA has mandated a review of Bt corn practices in 2001, and may prohibit its continued use if Bt corn effectiveness is then gone or greatly declining.

A product warranty is a well-known form of insurance, usually provided by a seller of a product or service to ensure the purchaser that the product or service is not defective and will perform as stated. Warranties can often be extended by purchase of additional insurance from or through the seller or retailer, for instance. Warranties can benefit a seller by reducing the risk to the purchaser of the purchase, by providing information on the purchaser to the seller, and the like. Again, no use of warranties to encourage or protect refuges from non-use in agriculture for the above purposes is known.

SUMMARY OF THE INVENTION

An object of the present invention is to level the financial incentives as between using 100% of a primary asset in an area having a protective control technique and using in a sufficient portion of the area a similar but unprotected secondary asset; Bt corn is an illustrative example, used with non-Bt, hybrid corn as a secondary asset. Producers such as farmers want to use best management practices ("BMP"), but will tend strongly to maximize their short-term returns by planting 100% of the protected asset to avoid risks and losses, such as an average 18% loss of yield in non-Bt corn assets. A premium for crop insurance sufficient to cover damage to the yield of the secondary, refuge asset as compared with the yield of the primary asset is included in or is added to the purchase price of the asset, such as Bt corn. Alternatively, a warranty can be provided by a seller of Bt corn that hybrid corn from the same seller for planting in a refuge area will have the same yield as the Bt corn as against specific damages or loss of yield from ECB. Such financial methods will encourage producers such as farmers to follow the BMP for the primary asset, thus preserving the effectiveness of the protection or control technique for many years. Incentives to spray insecticides on the secondary asset when beginnings of infestations are seen are also removed, reducing environmental pollution, and preserving the effectiveness of the refuge strategy. Proper use of refuge acres is also encouraged, as insurance or warranty payments for any reduced yield may not be made if the refuge(s) used are insufficient in area, are set in improper location(s), or are defeated by Bt spraying, or the like.

According to the principles of this invention, a premium per acre required to warrant the performance of the secondary asset, insure a producer for potential yield losses on a secondary asset, is determined by a participating seller or insurance carrier or underwriter. That warranty or insurance may be sold to the supplier of the primary asset, such as Bt seed corn, and the cost is either included directly in the purchase price of the asset, is stated in a "technology fee" paid with the purchase price, or the like. All such primary assets (as, all Bt corn) should carry such a premium, so as to avoid price competition between insured and uninsured (or warranted and non-warranted) primary assets. Exceptions may perhaps be made in certain defined "opt-out" categories. Price competition may exist as among sellers or insurers practicing the invention, assuring best prices in particular areas depending on past infestations, percentage of crop planted in primary assets, and the like. Further, insurance may be sold and certified to individual producers or types of producers, who then can buy protected assets at an uninsured price, possibly limiting their own insurance premiums through better management practices than average or by agreement to some other loss determination system, such as actual, meter-by-meter input and yield measurements enabled by systems such as the Case ADVANCED FARMING SYSTEM®. In either event, the producer will be the insured or a co-insured on the policy of crop insurance for the refuge area, or the protected party for a crop warranty.

The producer then will certify to the insurer or seller what areas are to be planted in the primary asset and which are a refuge for the secondary asset, as well as if needed the name and source designations of the primary and secondary assets. The insurer or seller should advise promptly if the plan does not comply with BMP and insurance policy or warranty requirements, particularly if benefits were to be denied in the first year on such grounds.

At an appropriate time, as in the middle of the growing season and/or when an infestation has taken hold, the producer or an expert will inspect the refuge for signs of pest infestation. A claim is then made to the insurer or seller if appropriate. An adjuster from the insurer or seller then inspects the refuge and may determine, first, compliance of the refuge with the plan and with insurance policy or warranty requirements. He or she then also if appropriate determines, as by stalk-splitting for ECB or other sampling techniques, the extent of the infestation and the amount of the damage to the secondary asset by insured or protected causes. The adjuster also preferably inspects the protected asset to determine the extent if any of development of resistance by the pest species in these areas. Damage and reduction in yield in the refuge area from ECB is known on the basis of tunnel lengths, and can be estimated by conventional techniques such as are used for hail and rootworm adjusting. If damage from covered causes in excess of the deductible (which generally will equal the cost of the Bt or like technology) is found, the loss is adjusted to equate with primary asset yield and price levels. Alternative manners and methods of adjusting for pest damage, such as "sentinel sites" in an area, may be used at less cost than individual field inspections, if found to be reliable. Adjustment of damage may be in cash at harvest time, in new seed corn for the following season, or the like.

Application of the method of the present invention will extend the useful life of pest control techniques, particularly in transgenic technologies, as against development of genetic resistance in the target pests to those techniques, by reducing the frequency with which resistant survivors mate with other resistant survivors. This invention is applicable to Bt corn, cotton, soybean, and other Bt crops, to potatoes, and to other plant and animal assets wherein refuges of similar but unprotected assets are now or are later found to be useful in protecting against longterm development of resistance in target pest or disease species.

THE PREFERRED EMBODIMENTS

Figure 1A:
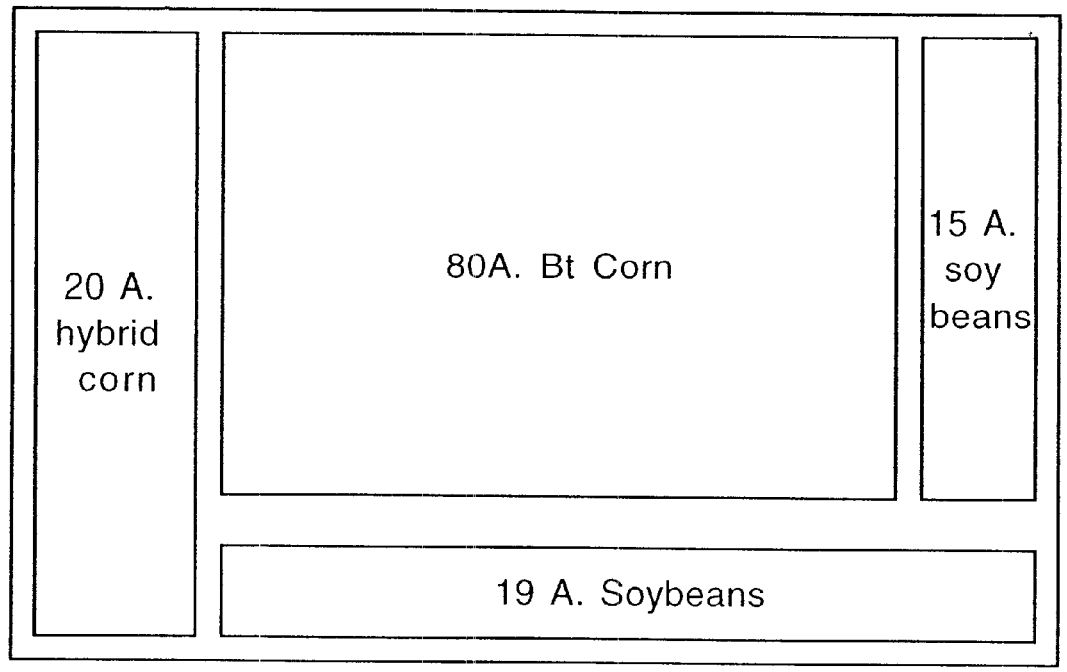
FIGS. 1A and 1B show, respectively, correct and incorrect refuge acre sizes and placements, as applied to an example of Bt corn as a primary asset and hybrid corn as a secondary asset, with the European Corn Borer as a target pest.

Pests and disease germs develop resistance to control techniques through processes of natural selection. Only those organisms resistant to a control technique such as a pesticide or able to avoid its application survive to mate and reproduce. The offspring of resistant parents may inherit the survival trait and if so may similarly avoid or survive exposure and later reproduce again. Soon the effectiveness of the control technique may be lessened, as discussed and shown for instance in the Ostlie reference, pages 10–12. In Ostlie's parlance, pests can be fully susceptible to a given toxin, with genes SS; or fully resistant, with genes RR; or have intermediate resistance, with genes SR or RS. If the control technique eliminates all pest individuals with one or both susceptibility genes, then only pests with RR genes will survive and reproduce. Mating of two RR individuals will produce all-resistant offspring, thus enabling survival and free reproduction of those selected by having high resistance to the toxin. By enabling a supply of non-resistant individuals to survive and mate, however, the rise of RR individuals and populations will be greatly delayed, as for 15 to 20 years versus the 2–3 year time for resistance to develop if all non-resistant individuals were quickly eliminated.

The practice of using refuge acres in crop agriculture, wherein populations of nonresistant pests are allowed to survive and to breed with resistant pests, is well established in theory, but is not fully implemented by farmers and other producers. In the example of Bt corn, wherein corn seeds are injected with a gene that causes European Corn Borers to die upon ingesting leaf or stalk material, yields are typically $18 per acre greater for Bt corn than for identical hybrids not so injected, on average. The sellers of Bt seed, under patent and technology licenses, add about a $10 per acre technology fee to their corn seed price, above the price of the normal hybrid seed alone. Producers then are instructed by label license on the Bt corn seed packages, required by EPA regulations, to reserve 5% to 30% of their corn acreage for refuges of similar hybrid corn to forestall the interbreeding of Bt-resistant, RR individuals in the pest population. Earnest educational programs, providing free hybrid seed for planting in refuges, and federal regulations are possible encouragers of compliance, but these methods are destined to fail more often than is desirable, due to the clear short-term financial incentive to plant 100% Bt corn.

Where the yield benefit of Bt corn over hybrid corn averages $18 per acre, and its technology fee cost is $10, the net average benefit to the producer is $8 per acre over normal hybrid corn. Where 20% of the total corn acreage is required to be set aside for the hybrid corn, that $8 benefit is lost on those 20% of the acres, reducing the benefit to $6.40 per Bt corn acre when planting Bt corn. Allowing for a $1 per corn acre administrative cost for compliance enforcement and adjustment of losses, the net benefit of the new technology is $5.40 per Bt corn acre from using Bt corn. Then, if the non-Bt, hybrid corn were given an incentive on average of $5.40 per acre, producers would be willing on average to comply with refuge requirements in their Bt corn seed licenses. That is, for a payment on average of $5.40 per Bt corn acre, the producer would be happy to adopt best management practices and to set aside the required refuge acreage.

However, in some years infestations of ECB or other targeted pests in the refuge acres will be worse than others. The producer may not be willing to risk a bad year, and so still would plant all Bt corn rather than risk a worse than average year, and guaranteeing the offending producer the expected $5.40 net technology benefit per acre. According to the invention, however, providing insurance (or a product warranty, which is a type of insurance) for substantially the actual loss experienced on the refuge acres compared to yield in the primary crop acres, such as that planted in Bt corn, will "level the field" in all conditions, with the insurer or seller accepting the risk of bad years for ECB losses in the refuge and the producer keeping the benefit of good, low-infestation years. This is a classic and beneficial use for insurance, but insurance and warranty principles have never been applied to this agricultural industry practice or this risk, to our knowledge.

Continuing the above Bt corn example, the refuge insurance or warranty could cost up to $12.60 per acre for 20 acres in refuge in a 100 acre corn crop, as in FIG. 1A, or $252. Assessing that cost across just the 80 acres planted in Bt corn seed, the insurance cost for the refuge per Bt acre is $3.15, or $7.56 per bag for a 2.4-acre supply of Bt seed corn. This insurance or warranty would then provide estimated full compensation, above the deductible cost of the technology and administration, for losses from the designated pest to the refuge acres crop, that is, for yield below that of the primary, Bt-corn planted acres.

Figure 2:
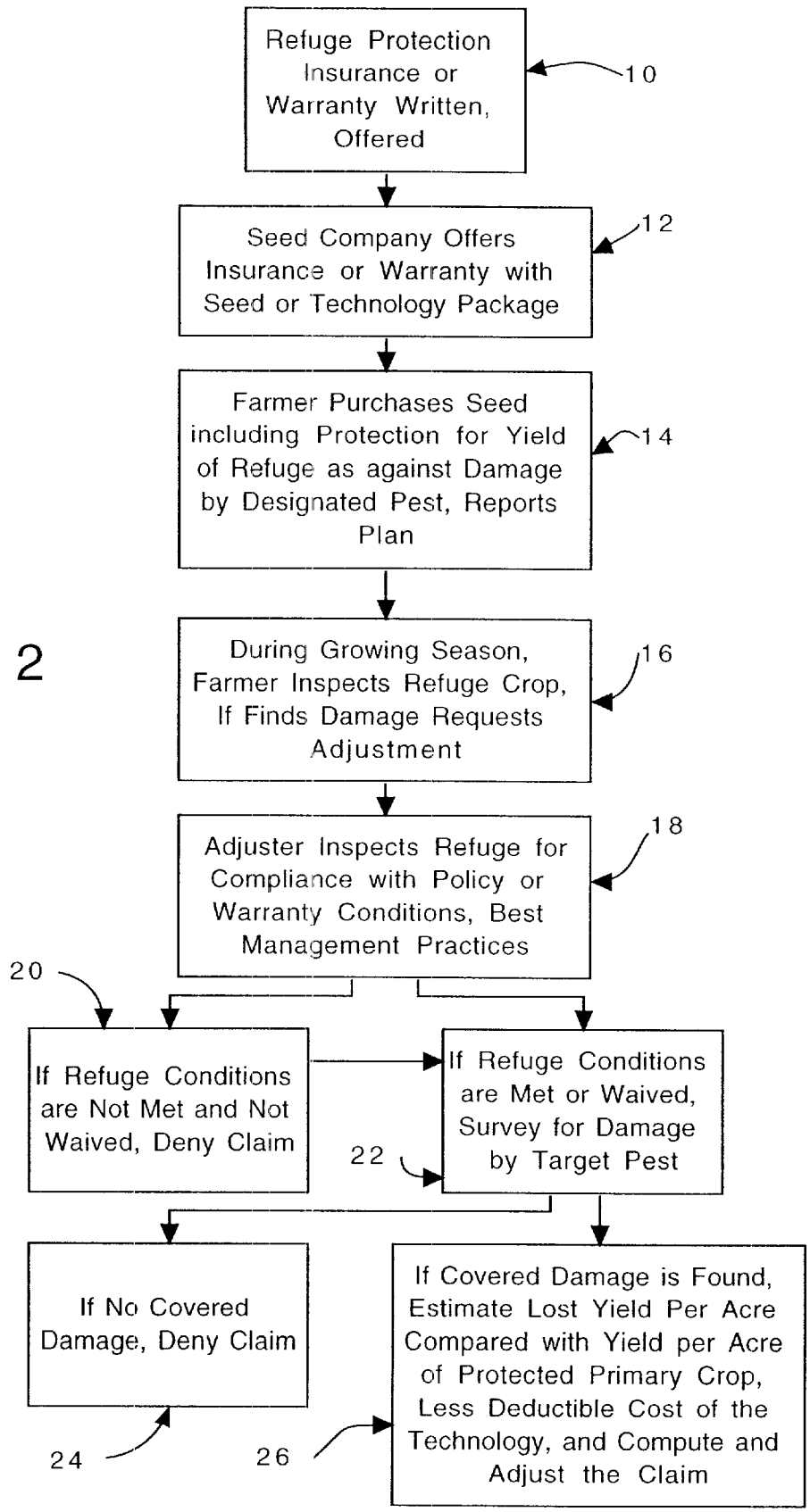
FIG. 2 is a flow diagram showing method steps useful in and for carrying out the present invention.

In use, in one form, the invention provides that an insurer writes and offers to seed companies and/or technology suppliers or others a policy of insurance against specific pest damage to a refuge area crop, as at 10 in FIG. 2. A seed company or technology supplier buys the policy as at 12 and passes the pro rata cost along with the price of the seed or other input. The farmer or other producer purchases the primary asset at 14, such as Bt corn, and pays the cost of the seed, a required technology fee, and an insurance fee (which may be included in the purchase price or the technology fee or be stated separately) for the 80 acres, for instance, to be planted on a farm or field as in FIG. 1A. The producer also signs a certificate of insurance with a named insurer, provided by the seed supplier and/or the technology source (e.g., Pioneer or Monsanto, respectively), guaranteeing the producer the economic benefits of Bt corn in the refuge area if that area is instead planted with a similar hybrid and maintained with water, fertilizer, other insecticides, etc. in the same way as the Bt corn crop.

Figure 1B:
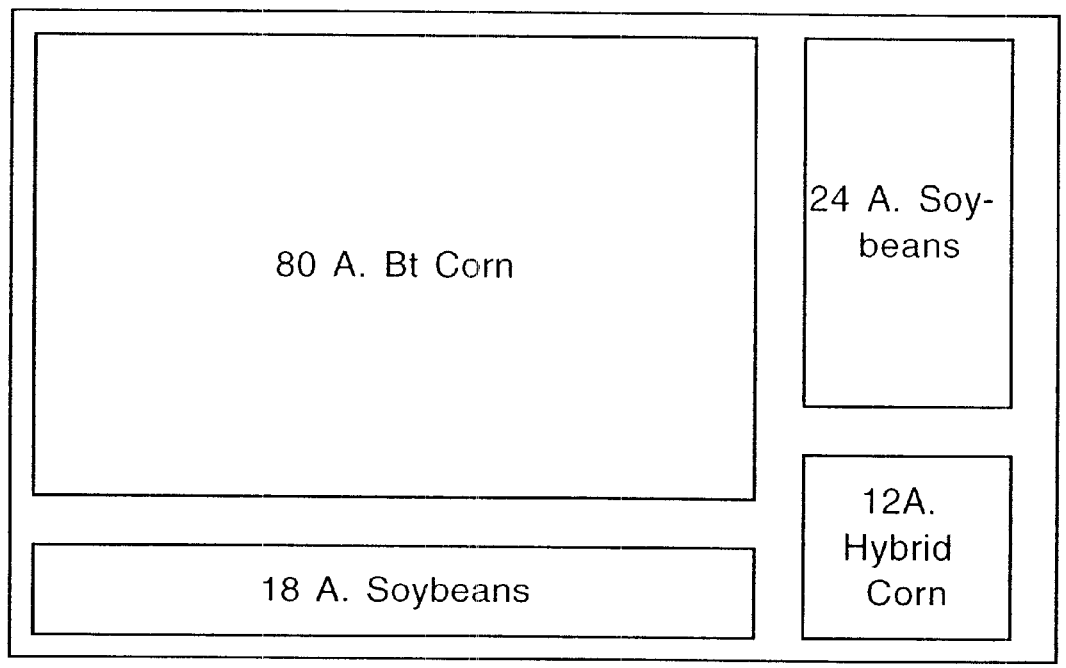

The producer submits to the insurer a field plan such as FIG. 1A for planting the Bt corn and the hybrid corn refuge, and identifies the varieties planted in each location. That plan is reviewed by the insurer, and the producer may be timely notified if the plan is in any way deficient, as the FIG. 1B plan is deficient both in placement (too remote from the Bt crop) and likely in size (less than 20% of the total corn acreage is a reserve).

Because the crop yield in the refuge is protected against loss from the ECB, the producer has no incentive to spray the field with insecticide should that pest appear. Such spraying would cost the producer money, add to pollution woes, and also reduce the crop damage from the ECB, reducing the insurance pay-out to be received. Further, a policy could provide that such spraying voids the insurance.

When the refuge crop is well grown, as between August 1 and harvest, and at a time to discover damage caused by any ECB in the refuge, the producer or his agent inspects the refuge area for signs of pest infestation and resulting crop yield reduction, as at 16 in FIG. 2. A claim is entered with the insurer if damage is preliminarily found, and the insurer sends out an agent to re-inspect the refuge, as at 18. The adjuster first checks the acreage of plantings of Bt and hybrid corn in the primary and secondary fields and confirms that the conditions for refuge planting were followed. If the planting of the refuge is found deficient, the claim may be denied on that basis, as at 20, or the deficiency may be used as a warning for correction of the refuge for the following year, or the like. If the refuge complies with BMP, as at 22, or a waiver is provided for that year, the adjuster then checks the secondary asset for damage, as by splitting stalks at random through the field in search of ECB and their tunnels. If no damage is found, as at 24, the claim is denied. If the infestation is found as at 26 to be low, for instance ⅓ to 1½ inches of tunnel length per plant inspected, a loss of 6.8 bushels per acre at the prevailing price, less the deductible, would be adjusted. Infestation of about 5 inches of tunnel length per plant would result in adjustment by a yield of 10.4 bushels per acre, at the prevailing price and less the deductible, still as at 26.

Other manners of estimating the loss if any can be devised, such as using "sentinel" acres in various spots around a county, each planted partly with Bt corn and partly with non-Bt hybrid corn. The differences in yields would be measured and the value paid pro rata to local farmers by the insurer(s). The adjustment would be made in cash at harvest time, or in seed the following spring, or at other times and manners such as on release of the crop from a grain elevator, as the producer and insurer have agreed.

In another form of the invention, a technology supplier (as Monsanto) or a supplier of both genetically-modified seed and hybrid, non-modified seed (as Pioneer) warrants to a purchaser of both modified and non-modified seed that the non-modified seed will have the same yield as the modified seed, as against damage by a specified pest, when planted in accord with refuge practices. That is, where a farmer buys transgenic seed for 80 acres of primary farmland and normal hybrid seed for a 20-acre refuge, the seller warrants to him or her (either as part of the purchase price or as an add-on "technology fee" or the like) that the refuge seed will provide a yield the same per acre as the primary farmland as against damage by the specified pest. If damage from the pest appears in the refuge, the farmer makes a warranty claim, which is handled much the same as in the insurance case, above. Alternatively, sellers could have their own sentinel plots in various areas to measure damage from the pest for adjusting automatically possible warranty claims by their purchasers.

By either such process and in similar methods according to the invention, the producer has not been disadvantaged at all, either short-term or long-term, by planting the normal hybrid as a refuge rather than planting 100% of his or her corn land as Bt corn. For example, a farmer violating the label licensing and planting 100% Bt corn on 100 acres would net a benefit of $5.40 per acre in an average year, or $540, from using the pest-resistant corn, after paying the technology and insurance fees. A farmer planting 80 acres in Bt corn and 20 acres in similar hybrid would net a benefit also of $540, whether his refuge was not damaged at all by ECB, was damaged just 10%, or was damaged 40% or more by ECB. In these latter two instances the insurance would make up the difference between the hybrid yield and the Bt corn yield. Bt corn and technology suppliers, as well as the environment, are benefited by preservation of susceptibility in the ECB population to the Bt toxin.

The same process and method of insuring or warranting refuge acre yields against specific losses can be used for other crops and pests and indeed for other agricultural and animal husbandry industries (as fish and livestock farms) to maintain long-term benefits through insurance products protecting against short-term risks of loss. Control techniques for species such as western corn rootworm (*Diabrotica virgifera* LeConte), northern corn rootworm (*Diabrotica barberi* Smith and Lawrence), southwestern corn borer (*Diatraea grandiosella* Dyar), common stalk borer (*Papaiperna nebris* Geunée), black cutworm (*Agrotis ipsilon* Hufnagel), armyworm (*Pseudaletia unipuncta* Haworth), fall armyworm (*Spodoptera frugiperda* J. E. Smith), corn earworm or cotton boll worm (*Helicoverpa zea* Boddie), cotton boll weevil (*Anthonomus grandis* Boh), and Colorado potato beetles (*Leptinotarsa decemlineata* Say), for instance, can be prserved over a longer term through refuge maintenance encouraged by insurance purchased with the seed or input item (as spray) to assume risks of losses on each season's refuge crop. Refuge maintenance techniques for such other crops and pests will differ in known ways from those for Bt corn, due to differences in the pests involved, such as their mobility, susceptibility traits, reproduction frequencies, etc., but the insurance and warranty processes will be substantially the same.

Many variations may be made in the methods shown and their manner of use without departing from the principles of the invention as pictured and described herein and claimed as our invention. "Insurance" as used in these claims includes warranties. Such minor variations will not avoid the use of the invention, which is defined solely by each of the appended claims.

We claim as our invention:

1. A method of encouraging and facilitating producers assisting in delaying the development in a pest species of resistance to a bio-genetic control technique directed against that species in the use of a primary asset employing that control technique, using refuges set out by individual ones of the producers, each of the refuges using a similar asset not employing that control technique and meeting conditions specified for management of the primary asset in regard to that pest species, the method comprising the steps of:

entering into a policy of indemnity insurance with each of a plurality of producers on the yields of the similar asset in the refuges as against any damage to be caused by the pest species therein;

facilitating the growing the primary asset in a first area and the similar asset in a second, refuge area, the first and second areas being laid out according to the conditions specified and the sizes and locations of such areas facilitating interbreeding of resistant and non-resistant members of the pest species;

inspecting, measuring, and testing each of the refuge areas for compliance with the conditions specified, and, if the conditions are complied with, also inspecting and testing the refuge asset and then computing, accounting and paying to ones of said producers meeting the conditions at least part of any estimated damage caused by the pest species to the similar asset in compliant ones of the refuges, thereby avoiding economic disincentive to the producers against properly using refuges in management of the primary asset.

2. The method defined in claim 1, wherein the pest species is the European Corn Borer.

3. The method defined in claim 1, wherein the pest species is a corn rootworm.

4. The method defined in claim 1, wherein the pest species is a corn earworm.

5. The method defined in claim 1, wherein the pest species is a cotton boll weevil.

6. The method defined in claim 1, wherein the pest species is a Colorado potato beetle.

7. The method defined in any of claims 1 to 5, wherein the control technique comprises genetic modification of the primary asset seed to produce a substance harmful to members of the pest species.

8. The method defined in any of claims 1 to 5, wherein the control technique comprises spraying the primary asset with a bacterial toxin harmful to members of the pest species.

9. The method defined in any of claims 1 to 5, wherein the control technique is spraying the primary asset with an insecticide.

10. The method defined in claim 2, wherein the primary asset is Bt corn.

11. The method defined in claim 5, wherein the primary asset is cotton.

12. The method defined in claim 6, wherein the primary asset is potatoes.

13. The method defined in claim 1, wherein the primary asset is soybeans.

14. The method defined in any of claims 1 to 4, wherein the secondary asset is corn.

15. The method defined in any of claims 1 to 5, wherein the cost of the policy of indemnity insurance is included in the purchase price for seed for the primary asset.

16. The method defined in any of claims 1 to 5, wherein the cost of the policy of indemnity insurance is added to the purchase price for seed for the primary asset.

17. The method defined in any of claims 1 to 5, wherein the cost of the policy of indemnity insurance is included in the purchase price for an input to the primary asset.

18. The method defined in any of claims 1 to 5, wherein the cost of the policy of indemnity insurance is included in the purchase price for a post-emergence input to the primary asset.

19. The method defined in any of claims 1 to 5, including a further step of assessing whether the refuge of at least one of the producers making a claim under the insurance has met the conditions specified for management, and wherein the payment is made if and only if the conditions specified for the refuge were met by the one producer.

20. A method of managing and administering pest resistance in the use of a genetically-modified asset using management criteria for same, wherein a refuge is provided with a similar, non-modified asset for maintaining a population of non-resistant pests, the method comprising the steps of:

providing a legally-binding policy of indemnity insurance for the yield of the nonmodified asset in the refuge sufficient to compensate for any damage caused by the pests in the refuge;

inspecting, measuring, and testing the refuge in event of a claim for pest damage and yield reduction and determining whether the refuge meets management criteria for same; and computing and providing payment for any estimated reduction in the yield caused by the pest in the refuge, to provide a return generally to the same extent as if the refuge had been provided entirely with the genetically-modified asset, thereby removing any disincentive from providing sufficient refuge space properly located for the non-modified asset.

21. The pest resistance management method of claim 20, wherein the primary asset is Bt corn, the pest is the European Corn Borer, and the non-modified crop is a hybrid corn.

22. The pest resistance management method of claim 21, wherein the refuge occupies at least about 15% of the area planted in corn and is located adjacent the acreage planted in Bt corn.

23. The pest resistance management method of claim 21, wherein the refuge occupies at least about 5% of the area planted in corn and is located adjacent the acreage planted in Bt corn.

24. The pest resistance management method of claim 20, wherein the insurance is provided and paid for as part of the purchase price of the modified asset.

25. The pest resistance management method of claim 20, wherein the insurance is provided and paid for by an add-on fee to the purchase price of the modified asset.

26. The pest resistance management method of claim 20, wherein the purchase price of the modified asset is raised to pay the premium for yield reduction insurance on hybrid corn in a refuge of at least about 20% of the area planted in the modified seed.

27. The pest resistance management method of claim 20, wherein the purchase price of the modified asset is raised to pay the premium for yield reduction insurance on hybrid corn in a refuge of at least about 5% of the area planted in the modified seed.

28. The pest resistance management method of claim 24, wherein a premium for the insurance is paid by the asset supply company and the insurance policy is co-signed by the asset purchaser.

29. The pest resistance management method of claim 26, wherein the determination of loss also includes specific assessment of the level of resistance of individual ones of the pests in the modified crop.

30. The pest resistance management method of claim 20, wherein the insurance is provided by the seller of an input to the modified asset and is added to the purchase price of the input.

31. The pest resistance management method of claim 30, wherein the asset is a crop and the input is a spray applied to the crop before its emergence from the ground.

32. The pest resistance management method of claim 30, wherein the input is a spray applied to the crop during its emergence from the ground.

33. The pest resistance management method of claim 30, wherein the input is a spray applied to the crop after its emergence from the ground.

34. The pest resistance management method of claim 20, further comprising the step of specifying area and proximity conditions for the refuge and wherein any payment for a loss to the primary asset is made if and only if the refuge substantially complies with the area and proximity conditions for the refuge.

35. A method of and system for delaying the development in a pest species of resistance to a control technique in protecting a primary asset from that pest species, by encouraging producers by economic means to use refuge areas under conditions requiring placement adjacent the areas for growing the primary asset and setting a minimum size relation to the area for growing the primary asset, wherein the refuge areas are occupied with a similar, secondary asset not protected by that technique and under specified conditions as to at least size and proximity to the primary asset, the method comprising the steps:

providing a policy of liability insurance against loss from damage to the similar asset from the pest upon each of the control technique with the primary asset;

assessing through measurement, calculation, and testing the compliance of each refuge area to the conditions of size and proximity to the corresponding area of the controlled, primary asset; and if a refuge substantially meets the conditions set, determining through calculation the monetary damage to the corresponding similar asset caused by the pest species and then paying at least a portion of that damage to the producer.

36. The method of claim 35, wherein the primary asset is a crop.

37. The method of claim 35, wherein the primary asset is Bt corn.

38. The method of claim 35, wherein the primary asset is potatoes.

39. The method of claim 35, wherein the primary asset is soybeans.

40. The method of claim 35, wherein the primary asset is cotton.

41. The method of claim 35, wherein the insurance is provided to the producer by the primary asset supplier.

42. The method of one of claims 37 to 40, wherein at least a portion of the cost of the insurance is included in the price of the primary asset for the benefit of each producer in proportion to the recommended size of the refuge, whereby to encourage provision by the producer of the correct size and location of the refuge for that similar asset.

43. The method of claim 41, wherein the insurance is provided to the producer by the owner of the pest control technology.

44. The method of claim 35, wherein applying additional treatment to the refuge as against the pest species is rendered non-economical to the producer.

45. The method of claim 35, wherein payment is denied if the refuge does not meet any condition as to size and proximity of the refuge to the primary crop in any season and combination of seasons.

46. Method for preserving through a relatively extended period of time the effectiveness of a bio-genetic pest control technology, the technology protecting one of two similar assets against damage from most members of a pest species, the one asset being grown from one of seed and eggs that are genetically modified to be toxic, harmful, or distasteful to most members of the pest species and the second asset having no such toxic, harmful, or distasteful property, the method comprising the physical steps:

transferring possession of one of said seed and eggs for the one asset from a technology provider only on conditions of (a) transfer of consideration by a purchaser of an insurance premium for a policy of protection of the purchaser from loss due to damage by the pest species to the second asset and of (b) agreement by the producer to conditions for growing or raising the second asset in relation to the one asset;

observing, measuring, calculating, and confirming the use of the second asset according to the growing or raising conditions set upon the transfer of possession of the seed or eggs;

inspecting and testing the second asset for any damage caused by the pest;

calculating the total cash loss or damage to the second asset based on the unit value of the one asset; and paying at least a portion of the cash value of said damage in the second asset to the purchaser of the one asset.

* * * * *